(12) United States Patent
Lecomte

(10) Patent No.: US 7,376,539 B2
(45) Date of Patent: May 20, 2008

(54) METHOD FOR SIMULATING LOCAL PRESTACK DEPTH MIGRATED SEISMIC IMAGES

(75) Inventor: Isabelle Lecomte, Skedsmokorset (NO)

(73) Assignee: Norsar, Kjeller (NO)

( * ) Notice: Subject to any disclaimer, the term of this patent is extended or adjusted under 35 U.S.C. 154(b) by 607 days.

(21) Appl. No.: 10/414,972

(22) Filed: Apr. 16, 2003

(65) Prior Publication Data

US 2005/0088913 A1    Apr. 28, 2005

(30) Foreign Application Priority Data

Apr. 9, 2003 (NO) ................... 20031631

(51) Int. Cl.
  *G06F 17/50*   (2006.01)
  *G01V 1/00*   (2006.01)
  *G03H 3/00*   (2006.01)

(52) U.S. Cl. .................... 703/1; 367/9; 702/16

(58) Field of Classification Search ............ 703/3, 703/5, 2, 10, 1; 367/14–116, 9; 181/101–122; 702/18; 175/1; 33/1 HH
See application file for complete search history.

(56) References Cited

U.S. PATENT DOCUMENTS

| | | | | |
|---|---|---|---|---|
| 5,781,503 A * | 7/1998 | Kim | ................ | 367/45 |
| 5,940,778 A * | 8/1999 | Marfurt et al. | ............... | 702/16 |
| 6,049,759 A * | 4/2000 | Etgen | ................ | 702/14 |
| 6,185,320 B1 * | 2/2001 | Bick et al. | ................ | 382/132 |
| 6,342,951 B1 * | 1/2002 | Eschbach et al. | ............ | 358/1.9 |
| 6,446,007 B1 * | 9/2002 | Finn et al. | ................ | 702/14 |
| 6,778,909 B1 * | 8/2004 | Popovici et al. | ............ | 702/17 |
| 2003/0012411 A1 * | 1/2003 | Sjostrom et al. | ............ | 382/109 |
| 2003/0048104 A1 * | 3/2003 | Stolarczyk | ................ | 324/337 |

OTHER PUBLICATIONS

Jacobians, http://ltcconline.net/greenl/courses/202/multipleIntegration/jacobians.htm, Lake Tahoe Community College, Feb. 26, 2001.*
Cafforio et al., Mar. 1991, IEEE Transactions on Aerospace and Electronic Systems, vol. 27, No. 2, SAR Data Focusing Using Seismic Migration Techniques, pp. 194-206.*
Yilmaz, Ö., 2001. Seismic Data Analysis: Processing, Inversion, and Interpretation of Seismic Data, vol. I and II. Society of Exploration Geophysicists, ISBN 1-56080-098-4 (vol. I) and ISBN 1-56080-099-2 (vol. II).
Lecomte, I., and Gelius, L.-J., 1998. Have a look at the resolution of prestack migration for any model, survey and wavefields. Expanded Abstracts, 68th SEG Annual Meeting, New-Orleans, SP2.3.

(Continued)

*Primary Examiner*—Paul Rodriguez
*Assistant Examiner*—Eunhee Kim
(74) *Attorney, Agent, or Firm*—Rodman & Rodman LLP

(57) ABSTRACT

A method, article of manufacture, and data set for simulating seismic prestack depth migrated images on the basis of a model of a selected GF-node, without the use of real or synthetic recorded data, provides a very efficient and flexible way to calculate a simulated depth migrated image as a function of parameters such as survey, overburden model, pulse, elastic wavefield, and local reflectivity structure. Important information needed for the method is the scattering wavenumber, calculated for example, by ray methods and other equivalent methods. Complex model geometry can be done in 2-D and 3-D.

25 Claims, 11 Drawing Sheets

OTHER PUBLICATIONS

Gelius, L.-J., and Lecomte, I., 1999. The resolution function in prestack depth migration, Extended Abstracts, EAGE 61st Annual Meeting, Helsinki, P134.

Gelius, L.-J., and Lecomte, I., 2000. The resolution function in linearized Born and Kirchhoff inversion, In: Lecture Notes in Earth Sciences:Methods and Applications of Inversion (P.C. Hanse, B.H. Jacobsen and K. Mosegaard, eds), Springer Verlag.

Gelius, L.-J., Lecomte, I., and Tabti, H., 2002. Analysis of the resolution function in seismic prestack depth imaging, Geophysical Prosepcting, 50, 505-515.

Hamran, S.-E., and Lecomte, I., 1993. Local plane wavenumber diffraction tomography in heterogeneous background. Part I: Theory, Jrnl. Seismic Explor., 2, 133-146.

Lecomte, I., and Hamran, S.-E., 1993. Local plane wavenumber diffraction tomography in heterogeneous background. Part II: Green's functions and finite-difference traveltimes, Jrnl. Seismic Explor., 2, 287-299.

Lecomte, I., 1999. Local and controlled prestack depth migration in complex areas, Geophysical Prospecting, 47, 799-818.

Lecomte, I., Hamran. S.-E., Tabti, H., and Gelius, L.-J., 2001. New insights in migration through analogies between Generalized Diffraction Tomography and Synthetic Aperture Radar, Expanded Abstracts, 71st SEG Annual Meeting, San Antonio, MIG P1.4.

Lecomte, I., Hamran, S.-E., and Gelius, L.-J., 2001. Improving Kirchhoff migration with repeated Local Plane-Wave Imaging: a SAR-inspired signal-processing approach, submitted to Geophysics, Dec. 2001.

Hamran, S.-E., Lecomte, I., and Gelius, L.-J., 2002. GPR Processing using Local Plane-Wave Imaging, Proceedings, GPR 2002 Conference, Santa-Barbara.

Lecomte, I., Hamran, S.-E., and Gelius, L.-J., 2002. Local Imaging approach and applications, Extended Abstracts, 64th EAGE Annual Meeting, Florence, B017.

Hamran, S.-E., Lecomte, I., and Gelius, L.-J., 2003. Local Plane-Wave Imaging of GPR Data, Jrnl. Environmental and Engineering Geophysics, in press.

Aki. K., and Richards, P. G., 1980. Quantitative Seismology, Theory and Methods: vol. I, Editor: Allan Cox, W. H. Freeman and Company, New York.

Bleistein, N., 1987. On the imaging of reflectors in the earth, Geophysics, 52, 931-942.

Miller, D. Oristaglio, M., and Beylkin, G., 1987. A new slant on seismic imaging: migration and integral geometry, Geophysics, 52, 943-964.

Schneider, W. A., 1978. Integral formulation for migration in two and three dimensions, Geophysics, 43, 49-76.

Hubral, P., Tygel, M., and Zien, H., 1991. Three-dimensional true-amplitude zero-offset migration, Geophysics, 56, 18-26.

Schleicher, J., Tygel, M., and Hubral, P., 1993. 3D true-amplitude finite-offset migration, Geophysics, 58, 1112-1126.

Vinje, V., Iversen, E., Åstebøl, K., and Gjøystdal, H., 1996, Estimation of multivalued arrivals using wavefront construction—Part I: Geophysical Prospecting, 44, 819-842.

Vinje, V., Iversen, E., Åstebøl, K., and Gjøystdal, H., 1996, Estimation of multivalued arrivals using wavefront construction—Part II: Tracing and interpolation: Geophysical Prospecting, 44, 843-858.

Vinje, V., Iversen, E., and Gjøystdal, H., 1993, traveltime and amplitude estimation using wavefront construction, Geophysics, 58, 1157-1166.

Vidale, J. 1988. Finite-difference calculation of travel times, Bulletin of the Seismological Society of America, 78, 2062-2076.

Podvin, P., and Lecomte, I., 1991. Finite difference computation of traveltimes in very contrasted velocity modes: a massively parallel approach and its associated tools, Geophys. J. Int., 105, 271-284.

Gelius, L.-J., Johansen, I., Sponheim, N., and Stamnes, J. J., 1991. A generalized diffraction tomography algorithm, J. Acoust. Soc. Am., 89, 523-528.

* cited by examiner

METHOD FOR SIMULATING LOCAL PRESTACK DEPTH MIGRATED SEISMIC IMAGES

BACKGROUND OF THE INVENTION

The ultimate goal of seismics is to find the elastic properties of the subsurface. Seismic energy in the form of compressional or shear waves is transmitted into the ground, and the reflections (echoes) from structures in the subsurface are recorded by sensors (hydrophones or geophones) most commonly located at, or near, the surface of the earth.

The wavefield recorded by the sensors is then processed in computers. The resulting "sound images" of the subsurface are interpreted by geophysicists and geologists to make maps of the reflecting structures. These structures are interpreted as interfaces (reflectors), which are reflecting because separating layers with different elastic properties. Such elastic property changes might indicate rock variations and other geological/petrophysical features, which in turn could indicate possible oil/gas traps.

The "sound images" obtained after data processing are also called migrated sections or migrated images. They can be obtained with a vertical axis in time (time migration) or in depth (depth migration). Time migration is a quick and simple processing, leading to seismic sections which might be directly interpreted by geologists in case of rather simple and flat structures. The ultimate goal is however to produce depth migrated sections to assure a more correct and accurate mapping of the reflecting structures.

The most classic processing sequence consists of first reducing the number of data by summing (stacking) nearby records (traces) after some corrections to compensate for different apertures (offsets) between the omission point (source) and the recording one (receiver). The data are then called poststack and can be time- or depth-migrated. To avoid too restrictive assumptions when stacking before processing, the data may also be kept as they are, i.e., with various offsets, and are than called prestack. There again, time- or depth-migration can be performed.

Elastic waves generated by artificial sources, such as those used in oil exploration, and propagating through the earth down to several kilometers, have limited capacities to distinguish small-scale structures. Their "detection power" (resolution) is controlled by different parameters such as the frequency band of the emitted signal, the propagation velocity of the waves, the geometry of the emitting/receiving system (survey) and the earth structure through which the elastic waves propagate.

Due to limited resolution, both across the reflectors and laterally, the migrated sections should be interpreted carefully. They represent a filtered version of the earth structure, with blurred reflectors and possible coherent artifacts not associated with actual reflectors. In addition, not all the reflectors are properly illuminated depending on the geometry of the survey and the way waves propagate in complicated earth structures. It is therefore interesting to control the migrated sections, either prior to the acquisition in order to define the best geometry (aperture and samplings) or after, i.e., at the interpretation level.

The only way to systematically test migration in realistic earth structures is per today to generate synthetic data and use them in the processing sequence. So, in addition to the cost of generating those data, the processing cost will be the same as for real data Moreover, no modeling technique is perfect, and their inherent limits might prevent their use.

Ray tracing methods can calculate synthetic data rather quickly, for chosen reflectors, but might also suffer from the high-frequency limit inherent in the method. Missing reflected events and possibly overestimated amplitudes at caustics might generate disturbing noise on the migrated sections. In opposition to ray tracing methods, the finite-difference modeling techniques, acting as black-boxes, will give all kind of waves, i.e., realistic traces. But the cost of this modeling is extremely high (executing time and memory requirements), especially in 3D models. In any case, synthetic data modeling will require expert users and is seldom used at the interpretation stage.

As a simple alternative to complicated modeling of data based on solving the wave propagation equations, ID-convolution is a technique much in favor, especially in the production groups of oil companies and contractors. This technique solves all easy case in earth modeling: primary reflections in the zero-offset case (poststack data) in a stack of horizontal, flat and homogeneous layers. The so-called "impulse-response" of the earth, i.e., a trace with just "spikes" at the different arrival times of the primary reflections, proportional to the reflecting strength (reflectivity) of each reflector, is convolved with a chosen pulse. The ID convolution method is fast and gives a rather good idea of the vertical resolution, i.e., if close reflectors in time/depth are detectable. But a stack of horizontal, homogeneous layers is usually a poor model of the earth and will not properly describe the actual 2D/3D heterogeneity of the structures and its implications on wave propagation.

The current patent application describes a new method which efficiently simulates prestack depth migrated sections without generating synthetic data to be used in the classic processing seismic sequence. A background model is required for ray tracing and equivalent methods but there is no need for detailed structure information in the target zone. The latter will, on the contrary, be sort of a variable in the process, i.e., several target models can be simulated with the same background model. Still with the same background model, various survey geometries and sub-selections, as well as various pulses, can be tried and the output will be simulated prestack depth migrated sections for each (target model, survey, pulse) case. Various applications of the method have been identified in important areas such as survey planning, interpretation, prestack depth migration (PSDM) and AVO/AVA analyses. The method is not restricted to seismic applications (oil exploration or shallower/deeper investigations) but covers all case of wave propagation similar to the elastic wave case. Potential applications in, for instance, Ground Penetrating Radar (GPR), have been already tested, and other applications could be in acoustical and medical imaging. An extension of the invention is also the generation of simulated seismic data. i.e., time recordings of seismic energy.

There is a comprehensive literature on seismic processing but to simplify, [1] gives a very good overall review in that domain. There, presentations and comparisons of different techniques for both seismic modeling and imaging can be found. The simulated prestack depth migration process, which is the subject of the present patent, has been developed as an indirect result of studies of the concept of resolution function in seismics ([2],[3],[4],[5]). This function is naturally defined in a specific class of imaging techniques called Generalized Diffraction Tomography ([6], [7], [8]). The latter approach was recently re-programed in terms of local imaging using Fast Fourier Transforms ((F) FT) in wavenumber domains, and illustrated in both seismics and GPR cases ([9], [10], [11], [12], [13]). The simulated prestack local imaging process—hereafter referred to as "SimPLI"—is derived from the local imaging concept for the case where no seismic (or GPR) recordings (synthetic or real) are available. In the following, the seismic domain is used to explain and illustrate the present invention.

BRIEF DESCRIPTION OF THE DRAWINGS

Features and advantages of the present invention are described herein with reference to example embodiments shown in the appended figures where.

DEFINITIONS

Figure 1:
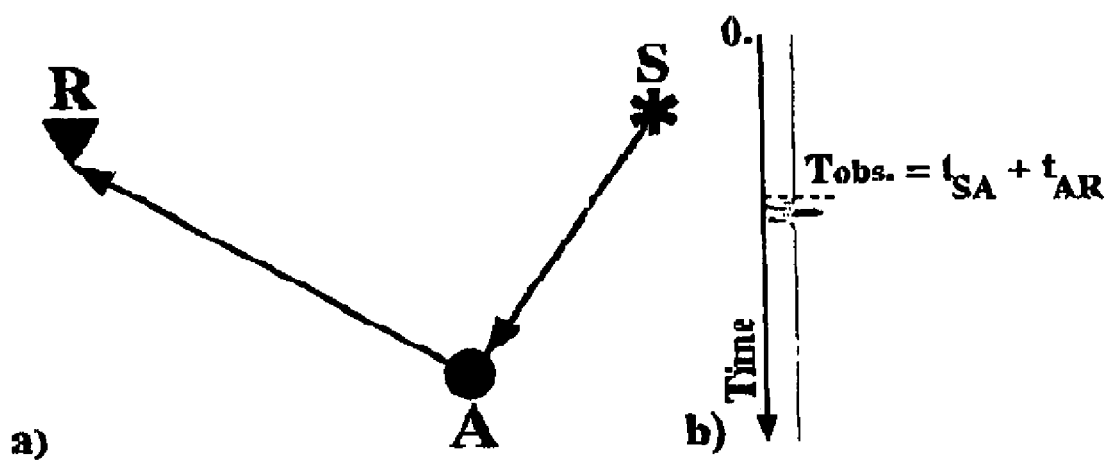
FIG. 1 is a schematic representation of a seismic recording for a source illuminating a point scatterer.

Some terms and acronyms used in the following paragraphs are defined:

PSDM: PreStack Depth Migration.

Target area: spatial zone in the earth for which the migrated image is to be calculated.

Acquisition surfaces: surfaces along which sources and receivers might be located in a survey.

Station point: point of an acquisition surface from/on which GF have been calculated.

(F)FT: (Fast-)Fourier Transform.

GF: Green's functions in a large sense of the term (the classic definition can be found in Aki. K., and Richards, P. G., 1980. Quantitative Seismology, Theory and Methods: Volume I, Editor: Allan Cox, W. H. Freeman and Company, New York, i.e., all information needed to correct the recorded fields from the propagation effects from the sources/receivers down to the target. Traveltimes and amplitudes are examples of such GF information.

GF-node: Point in the target area where GF are calculated/available.

Scatterer: point, which will diffract/scatter the incident energy because attached to a local contrast of elastic parameters. A reflector can be seen as a sequence of point scatterers.

GDT: Generalized Diffraction Tomography, See Hamran, S. -E., and Lecomte, I., 1993. Local plane wavenumber diffraction tomography in heterogeneous background. Part I: Theory, Jrnl. Seismic Explor., 2, 133-146; Lecomte, I., and Hamran, S. -E., 1993. Local plane wavenumber diffraction tomography in heterogeneous background. Part II: Green's functions and finite-difference traveltimes, Jrnl. Seismic Explor., 2, 287-299; Lecomte, I., 1999. Local and controlled prestack depth migration in complex areas, Geophysical Prospecting, 47, 799-818.

Slowness vector: vector characterizing the direction of propagation of a plane wave, proportional to the frequency and inverse proportional to the velocity.

Scattering Wavenumber K: vector formed by the difference of the slowness vector attached to the incident field and the slowness vector attached to the scattered field.

LI: Local Imaging. Technique defined in Lecomte, I., Hamran, S. -E., Tabti, H., and Gelius, L. -J., 2001. New insights in migration through analogies between Generalized Diffraction Tomography and Synthetic Aperture Radar, Expanded Abstracts, $71^{st}$ SEG Annual Meeting, San Antonio, MIG P1.4; Lecomte, I., Hamran, S. -E., and Gelius, L. -J., 2001. Improving Kirchhoff migration with repeated Local Plane-Wave Imaging: a SAR-inspired signal-processing approach, submitted to Geophysics, December 2001; Hamran, S. -E., Lecomte, I., and Gelius, L. -J., 2002. GPR Processing using Local Plane-Wave Imaging, Proceedings, GPR 2002 Conference, Santa-Barbara; Lecomte, I., Hamran, S. -E., and Gelius, L. -J., 2002. Local Imaging approach and applications, Extended Abstracts, 64th EAGE Annual Meeting, Florence, B017; Hamran, S. -E., Lecomte, I., and Gelius, L. -J., 2003. Local Plane-Wave Imaging of GPR Data, Jrnl. Environmental and Engineering Geophysics, in press. Element of a classic PSDM where a local image of arbitrary size and sampling is obtained around each GF-node in the target area.

SimPLI: acronym to designate the new method at the origin of the present patent, i.e., Simulated Prestack Local Imaging.

SAR: Synthetic Aperture Radar.

RF: Resolution Functions. Includes PSF and RSF

PSF: Point-Spread Functions (see optics). Resolution functions characterizing a point-scatterer.

RSF: Reflector-Spread Functions (as introduced by Gelius, L. -J., Lecomte, I., and Tabti, H., 2002. Analysis of the resolution function in seismic prestack depth imaging, Geophysical Prospecting, 50, 505-515.). Resolution functions characterizing a local piece of a reflector.

DETAILED DESCRIPTION OF THE INVENTION

To properly and completely introduce the present invention, a review of the local imaging technique, as introduced in ([9], [10], [11], [12], [13]) and not yet well known in the seismic community, is necessary to acquire a good understanding of the data-based imaging approach, which will then help understanding the present invention.

PreStack Depth Migration (PSDM) should be the ultimate stage of a seismic processing sequence, although post-/prestack time migration might be sufficient for the interpreters. The goal is to obtain good-quality depth images of the reflecting/diffracting structures, as perceived by the elastic waves generated in a seismic acquisition. A powerful approach in both seismic modeling and processing is to consider the reflecting structures in the earth as sets of point scatterers radiating back the incident energy (see the concept of exploding reflector for instance, [1]). The scattered energy is recorded and PSDM is the tool used to focus this energy backwards in a background velocity field to form the final image in a pre-selected target area, i.e., getting back the point scatterers (location and strength). The two important terms here are "backwards" and "focus". A PSDM process will indeed be a combination of two steps:

1. a back-propagating process, which starts from the recorded fields at the actual set of receivers and attempts to re-create the wavefield at earlier stages, i.e., as if recorded at fictitious receivers (image points) in the target area.

2. an imaging process, i.e., the focusing process which gives back the scattering properties at each image point. If a scatterer was located at the considered image point, energy will be present at time=0 on the back-propagated seismogram calculated in stage 1, energy which will be assigned to the image point as a measure of its scattering properties.

There are two major classes of PSDM:

1. The integral or summation techniques ([15], [16], [17]), also referred to as Kirchhoff migration in a wide sense, and 2. The wave equation approaches (see [1]).

The main difference between these two classes is the way the back-propagation is performed. Kirchhoff-type approaches use ray tracing to compute at least traveltimes (possibly also amplitudes, slowness vectors, etc) between all shot/receiver locations and the image points. Wave equation approaches use instead directly the wave equation, as solved by finite-differences, to perform the back-propagation process as a black-box, depth step after depth step. In the present patent, we are working within the Kirchhoff-type of approach.

To simply illustrate what PSDM does, in a Kirchhoff-type of approach, let us first consider a very simple model with one point scatterer embedded in a homogeneous earth and one couple shot-receiver (FIG. 1a). The background model being homogeneous, the energy travels along straight raypaths in this example, but in general earth structures curved rays are the usual. Energy generated at source S reaches the scatterer A after traveltime $t_{SA}$. The scatterer is then back-radiating part of the incident energy, and the scattered energy reaches receiver R after traveltime $t_{AR}$. The recording (seismogram) at that receiver is plotted and shows a pulse arriving at total time $t_{SA}+t_{AR}=t_{obe}$ (FIG. 1b). The seismogram will be the input to the PSDM process.

Figure 2:
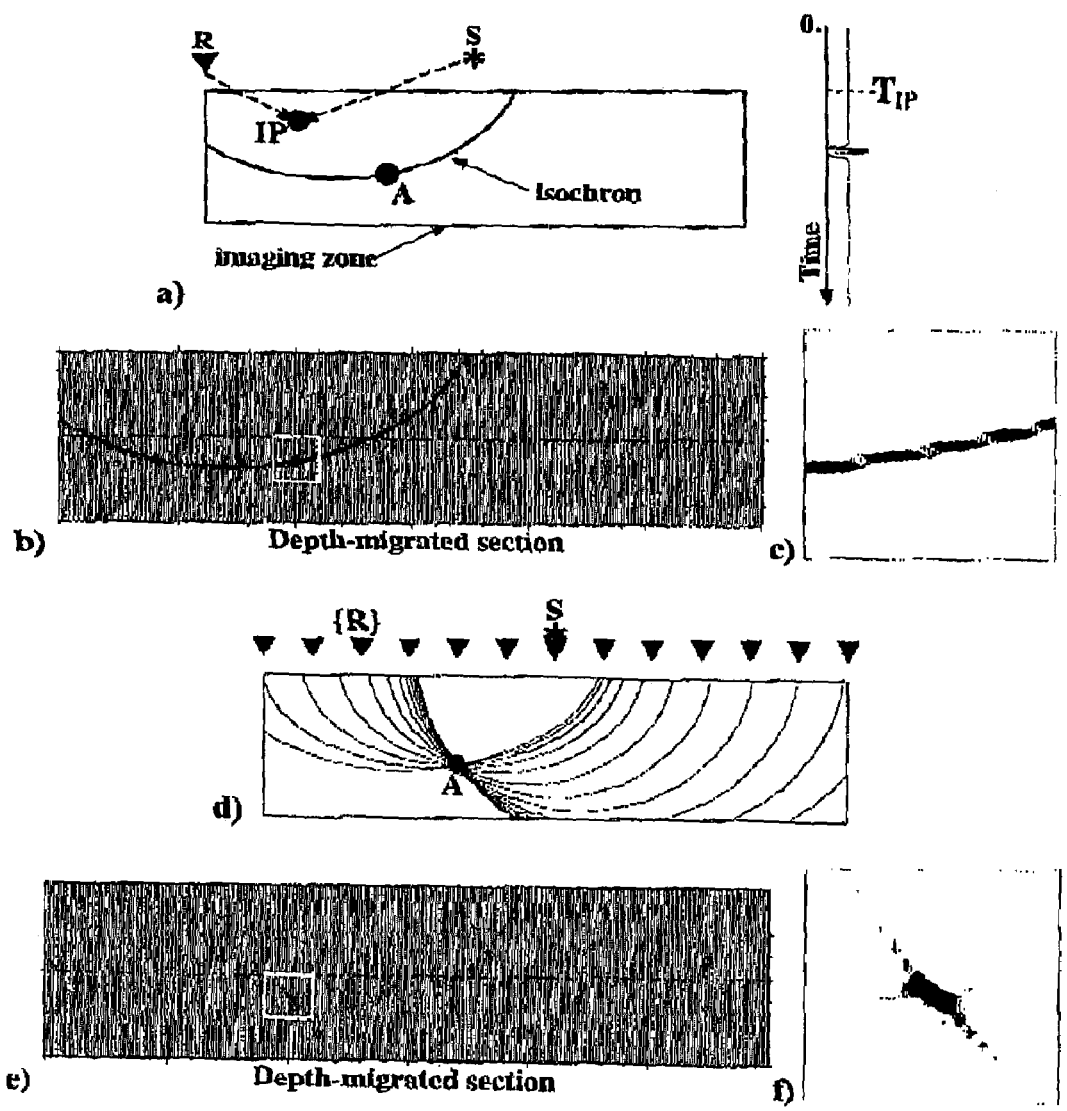
FIG. 2 is a schematic representation of the seismic imaging process where recorded energy is mapped back in depth.

Assuming that the background velocity field is known—a major requirement in PSDM!—ray tracing techniques or equivalent can be used to compute traveltimes $t_{S-IP}$ and $t_{R-IP}$ between the source and each image point, respectively between the receiver and each image point (FIG. 2a). The total time $t_{S-IP}+t_{R-IP}$ gives then, for each image point, the recording time along the seismogram at which the scattered energy (if some) from that point should be recorded. The corresponding amplitude is then spread by the PSDM process along the loci of points having $t_{S-IP}+t_{R-IP}=t_{obe}$, i.e., an isochron which is, in the homogeneous case, an ellipse in 2D with source and receiver as its focal points (FIG. 2b). With only one recording (one source/receiver couple), it is impossible to determine which point along the ellipse is the actual scatterer (FIG. 2c). But when considering other source/receiver couples, the ellipses will be summed up (FIG. 2d), with constructive interferences at the scatterer and destructive interferences elsewhere (FIG. 2e). The quality of the interference pattern will however greatly depend on the survey geometry (location, range and sampling), the pulse emitted by the source and the background field (FIG. 2f). The interference pattern is also image-point location-dependent.

Without going into details, a short description of the typical processing sequence in Kirchhoff-type migration is given in the following:

1. Chose a background model (defined from velocity analyses, etc.)

2. Define a target area, i.e., the imaging zone (for example a rectangular grid or any other surface/volume). The sampling can be coarse if interpolation techniques can be applied later during the imaging, this in order to reduce the data size on computer disk.

3. Pre-calculate the Green's Functions (GF) between all shot/receiver positions to be considered and all GF-nodes of the target area. These data are usually stored on disk files.

4. Loop over the recordings: one couple source/receiver per trace.

5. Loop over the image point in the target zones if the image point is not a GF-node, perform first GF-interpolation to get the appropriate GF. Then correct for wave propagation effect between source/receiver and the considered image point. At last, extract the scattering properties attached to the image point and sum with the current ones.

6. End loop image points.

7. End loop recordings.

There are many possible variations between the existing summation-methods in PSDM, with different GF-interpolations if used, different weighting factors when correcting for the wave propagation between source/receiver and image points, especially to get closer to preserved-amplitude PSDM ([18], [19]), and so on. But all Kirchhoff-type techniques need GF as calculated by ray tracing, i.e., with a high-frequency approximation. Recent efficient and robust ray tracing techniques such as Wavefront Construction ([20], [21], [22]), or equivalent like the Eikonal Solvers ([23], [24]), allow efficient and flexible target-oriented Kirchhoff-type PSDM.

Among the summation-methods in PSDM. Generalized Diffraction Tomography (GDT) is little known in reflection seismics because usually associated to tomography techniques, i.e., techniques using transmitted waves to recover slowness perturbation fields from interpreted time-delays with respect to an initial model, for instance between two boreholes. GDT can indeed be used for such studies ([25]) but can also be used for imaging of seismic reflection data ([6], [7], [8]). The development of the technique is originally done within the Born approximation (smooth and weak scatterer defined by a slowness perturbation) but comparison studies with more classic Kirchhoff-migration techniques, using reflectors as the objects to retrieve (reflectivity as output), show that the difference is merely a scattering-pattern factor correction ([4], [5]). The original contribution of GDT is to introduce imaging as a Fourier Transform process, which helps to better understand illumination and resolution effects ([6], [2]).

Inspired from techniques used in Synthetic Radar Aperture (SAR) imaging ([26]), GDT has been recently revised to get a more powerful and flexible signal-processing approach of PSDM ([9], [10], [11], [12], [13]). Imaging is first performed at each or some of the GF-nodes in a local process, i.e., producing a local image (LI) exactly valid at the corresponding GF-node and possibly showing some distortion efforts further away from the latter. Classic prestack depth migrated sections are then obtained by merging the LI with interpolation between neighboring GF-nodes if necessary. The generation of a local image of arbitrarily sizes and samplings around each considered GF-node is the major difference with the classic PSDM approaches, which only affect one value at each GF-node, i.e., a "local image" with only one point. In GDT, each LI is obtained by (Fast) Fourier Transform ((F)FT) of maps of the seismic energy in a wavenumber domain, after correction of the wave propagation effects from the GF information. The key parameter behind the local imaging is the scattering wavenumber K.

Figure 3:
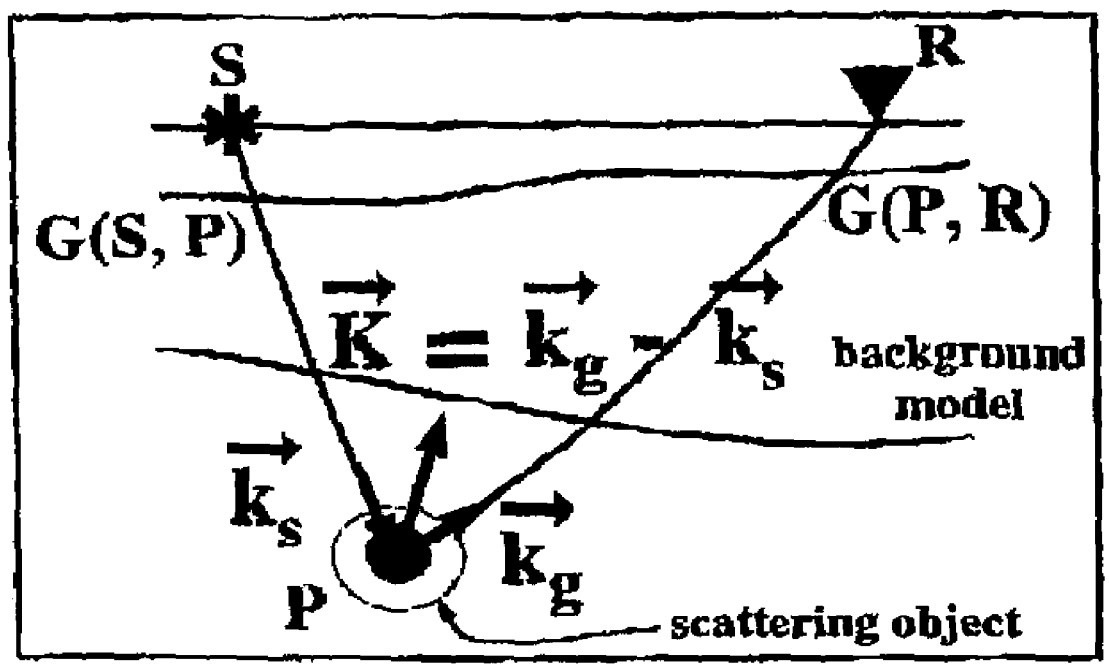
FIG. 3 is a schematic representation of the scattering wavenumber vector, which is mandatory information for the present invention.

K is defined in GDT as the difference between wavenumber $k_g$, attached to the incident wavefield generated at a source S and illuminating a scattering object around a reference point P (GF-node), and wavenumber $k_s$ attached to the scattered wavefield, recorded at a geophone R (FIG. 3). G(S,P) and G(P,R) are the Green's functions in the background model relating the source with the GF-node in the scattering object, respectively relating the GF-node with the receiver. K is given by [6], $$K(r) = k_g(r) - k_s(r) \text{ with } k(r) = \frac{\omega}{V(r)}\hat{u}(r) \quad \text{Eq. 1}$$

Variables with bold letters refer to vectors. In Eq. 1, $\omega$ is the angular frequency, V(r) is the propagation velocity of the corresponding wavefield at location r, and $\hat{u}(r)$ is a unit-vector indicating the propagation direction of the same wavefield. V(r) can be different for $k_g(r)$ and $k_s(r)$. This is the case in seismics when wave conversion at a reflector occurs, i.e., for instance the P-to-S conversion used in offshore seismics for ocean bottom surveys, this wave-phase carrying different information than the classic primary P reflection.

Note that some authors use a different definition, leading to a vector of opposite direction ([15], [16]) but this does not change fundamentally the result. K is indeed the natural integrand of all integral methods in PSDM, i.e., migrated results are obtained via an integral of the form.

$$\gamma(r) = \int_{[k]} \frac{P(r_s, r_g, \omega)}{\text{Source}(\omega)G(r_s, r, \omega)G(r, r_g, \omega)} H(r_s, r_g, \omega, r)dK \quad \text{Eq. 2}$$

where $P(r_R, r_g, \omega)$ is the recorded field in the frequency domain, Source($\omega$) is the source signature, $G(r_s, r, \omega)$ and $G(r, r_g, \omega)$ are the GF in the background model between the source and the image point, respectively between the image point and the receiver, $\gamma(r)$ is the retrieved quantity after PSDM (object function in Born approaches, reflectivity in Kirchhoff, etc), and $H(r_s, r_g, \omega, r)$ the kernel of the integral describing radiation pattern and other correction factors. So the most natural is to integrate locally over the available set of K, and this is what is done in SAR. However, all classic integral techniques in seismic PSDM operate a coordinate transformation to go back to survey-type coordinates like source and receiver positions parameterized along an acquisition line/surface. Such approaches require the complicated Jacobian calculations to go from the local K coordinate system to global coordinates. By keeping the most natural coordinate system for K, the integration can be performed by (F)FT and yielding the LI mentioned previously.

Figure 4:
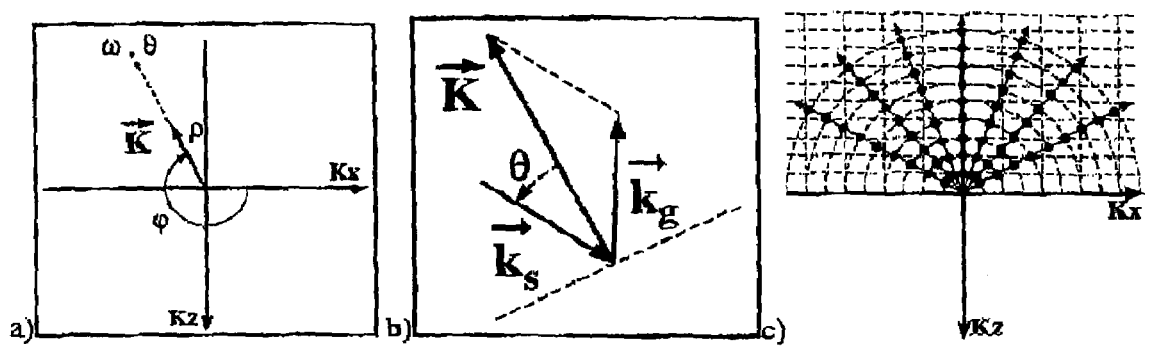
FIG. 4 is a schematic representation of the different local coordinate systems to be used for mapping the scattering wavenumber.

Without going into details, the local distribution of K at a chosen GF-node is analyzed first in its natural coordinate system (polar in 2D denoted ($\rho,\phi$) in FIG. 4a—spherical in 3D), $\rho$ is dependent on the angular frequency $\omega$ and the incident angle $\theta$ (FIG. 4b). If reflected energy is attached to this incident/scattered wavenumber couple, K is normal to the reflector (dashed line) and $\theta$ is the incident reflection angle. In such a local coordinate system, many processes can be performed, like re-sampling, band-selection in dip/azimuth and reflection-angle, etc. In SAR imaging, due to simpler background structures (atmosphere, which is nearly homogeneous), the K are regularly sampled and there are many methods to make an efficient polar-to-rectangular mapping (FIG. 4c) before taking a (F)FT to get the image in the space domain. Unfortunately, when waves (elastic and electromagnetic) go through the earth, propagation patterns are much more complicated and are available K are not anymore regularly sampled. If not treated properly, such irregular samplings may generate artificial coherent noise pattern on the migrated sections, thus the interest of working locally in a signal-processing approach. In addition, the complicated Jacobian calculations of the classic approaches are avoided because only a simple polar/spherical-to-rectangular coordinate transformation is needed, independently of the survey geometry. A proper Jacobian calculation is a necessity to get the best result, i.e., with the best possible resolution.

Figure 5:
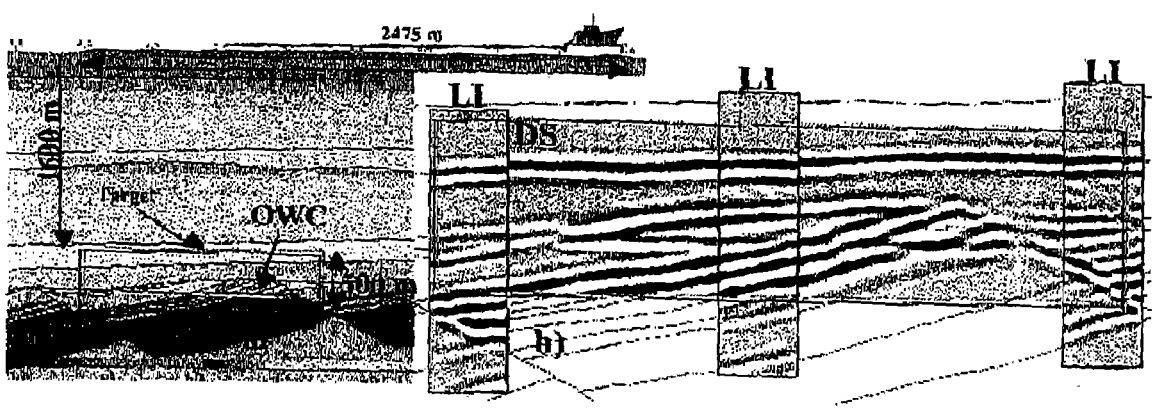
FIG. 5 is a realistic example of the local imaging method at the origin of the present invention.

FIG. 5 is an example of local imaging in a realistic model of the Gullfaks oil/gas field (Courtesy of Statoil) in the Norwegian Continental Shelf ([12]). The marine survey and the P-wave velocity model, with the reservoir as the PSDM target (with an Oil Water Contact) are given in FIG. 5a. Synthetic data were calculated using a hybrid ray tracing/finite difference technique. Greens functions are calculated at the nodes of a regular grid over the whole target area. Local images (LI) are superimposed on the classic PSDM image (Diffraction Stack—DS—technique) in FIG. 5b. Each LI is obtained considering only the Green's functions at their corresponding GF-node, i.e., their center point. Note that the LI give very valuable information both about the structure in the target as well as the structure outside the original grid of Green's functions, something classic summation techniques PSDM cannot do.

Figure 6:
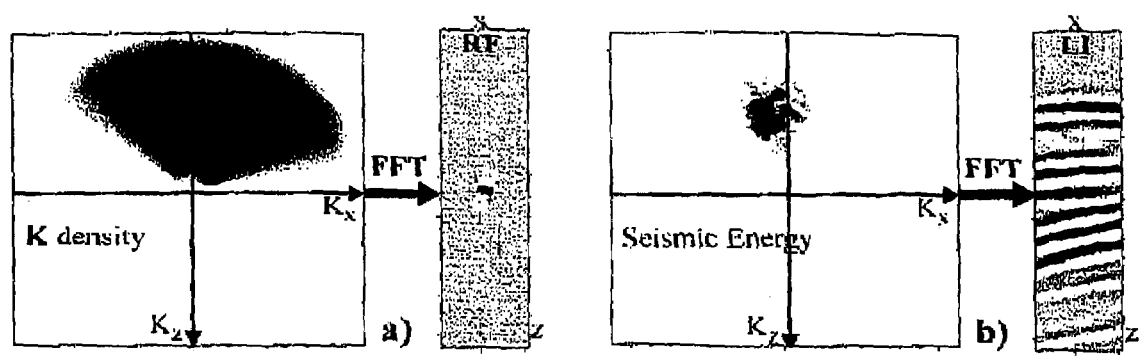
FIG. 6 is an example of various output from the local imaging method at the origin of the present method.

When performing the polar-to-rectangular mapping, the weight affected at each K will define the type of image. Resolution functions (RF) are thus obtained when not considering any recorded energy but simply affecting a constant value at each K, possibly with some weighting factors conditioned by the GF (FIG. 6a). After (F)FT. we get a spatial image which can be interpreted as the "scatterer-response" of the system, also called Point-Spread Functions (PSF) in many other domains. If the structure consists more into reflectors than isolated scatterers, the term of Reflector-Spread Function (RSF) can be used ([5]).

If in addition recorded data are available, their energy can be mapped in the K domain after propagation corrections (traveltime, amplitudes, etc) and the local image obtained after (F)FT is a local prestack depth migrated section ([9], [10], [11], [12], [13]) (FIG. 6b). The term "local" do not only refer to the location of the image around the GF-node—this image can be calculated with arbitrary sizes—but also to the validity of the image. The original information is the K distribution at only one GF-node, and (F)FT is used to perform the summation from the K-domain to the spatial one. This means that the local image is strictly valid only at the GF-node, i.e., the value at the GF-node is the value, which would be obtained by other more classic PSDM techniques. For the image to be valid further away from the GF-node, i.e., without any distortions, there should be 1. no velocity variation across the image, and
2. locally-plane wavefronts across the image as well.

This is due to the local (F)FT-summation, which is based on plane wavefronts in a homogeneous background. These conditions might seem restrictive but the practice shows that the local images are very good approximations of the actual images in rather large areas around the GF-nodes (see FIG. 5). Local images are therefore interesting at two levels:

1. quick-to-obtain images, especially if the GF-node is used as a potential source for the GF calculations at that point, i.e., all GF are calculated in one run (GF-node centered approach), instead of calculating the GF from all possible locations of source/receiver towards that GE-node, and
2. alternative to interpolation of GF between GF-nodes distributed on a coarse grid in classic PSDM ([10], [12]). The final PSDM section is formed by merging the local images applying spatial interpolations between neighboring images if necessary.

As mentioned, the major limitation of these (F)FT-based local images is due to possible image distortions further away from the attached GF-node due to the fact that the local FT-summation is base on plane wavefronts in homogeneous background. The latter approximations affect mostly the traveltime, which is the fundamental information required by any summation-techniques in PSDM in order to locate back in time/space the scattered energy after propagation corrections. This comment is of importance for the new method, explained further which will simulate PSDM sections without needing traveltime information, and which will therefore be not affected by image distortions.

Figure 7:
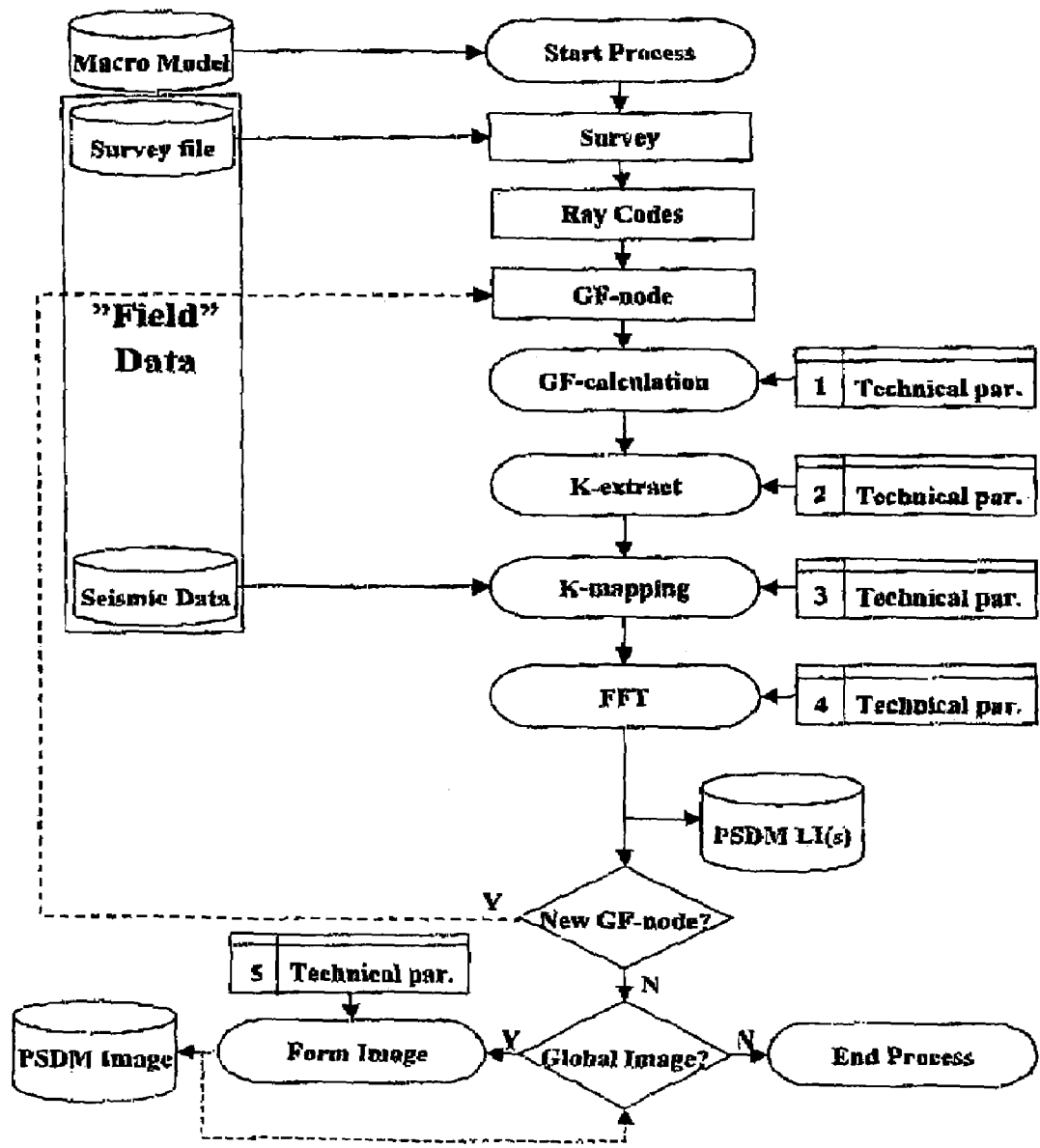
FIG. 7 is a flowchart over a possible code using the local imaging approach at the origin of the present invention.

FIG. 7 is a flowchart of a possible GDT-PSDM process using powerfully the LI concept. Unlike most other approaches, the GF calculation is here performed from each GF-node towards all locations taken by sources and receivers in an acquisition survey (GF-node centered approach). In that way, if only one local image location is to be considered. i.e., one GF-node, the GF calculation process will be very fast compared to approaches where all locations of source/receiver would be each a source location of the GF calculation. Both approaches are however valid and it is only the application determining which one will be the most efficient. Note that in the GF-node centered approach, it is very easy to simply parallelize the process by distributing the GF-nodes over a network of computers.

Lot us briefly describe the flowchart in FIG. 7, which will be later compared to the flowchart of the simulated PSDM process (FIG. 8), which is an embodiment of the present invention:

1. The external input in a classic PSDM process are "field data", either recorded or synthetic, attached to a given survey. These are fixed information, impossible to change during the PSDM process, except for sub-selection of the data.
2. A background velocity model is needed for the GF calculation. This model is usually a "macro-model", i.e., suitable for ray-tracing type GF-calculations with rather larger scale and smooth parameter fields. The smoothness is even more necessary at the target level with no sharp parameter discontinuities.
3. The first input a user chooses in a summation-type PSDM, are the wave phases to consider, if using ray tracing and equivalent for GF calculation. Wave equation techniques do not allow this flexibility.
4. The target area is then defined with a set of GF-nodes (arbitrarily distribution, but most often on regular grids).
5. For one GF-node: the GF calculation can be quickly performed if a fictitious source is located at the GF-node itself (see earlier comments about that specific choice, i.e., the GF-node centered approach).
6. For one GF-node: according to some selection parameters, extract the corresponding K (or more exactly K/ω). Re-ordering and sub-selection of data can be done according to source/receiver, or locally to dip/azimuth (3D)/reflection angle. Re-sampling can also be performed to compensate for irregular and too-coarse samplings all the acquisition.
7. For one GF-node: map In the K-domain the recorded/synthetic energy after propagation correction. Take care of tho Jacobian of the polar-to-rectangular coordinate transformation. It is possible to band-filtered the data in the frequency domain and apply classic signal-processings.
8. For one GF-node: inverse-(F)FT to get the local image in spatial coordinates.
9. Store the local image is wished.
10. Next GF-node if some.
11. To get a larger PSDM section without distortion effects, if wished, merge the local images, using interpolation between neighboring images. Classic PSDM results are equivalent to such global images obtained by just considering the reference point of the local images, i.e., keeping the migrated value at the GF-node.

To summarize the previous flowchart, if a user has either field-recorded data or synthetic-generated data, a summation-type PSDM allows data sub-selection and wave-phases selection. But the overall process is constrained by the necessity of having data. Let us consider two typical cases where geologists/geophysicists do not have access to data:

1. survey-planning studies, where recorded data do not exist and the generation of synthetic data for each possible survey would be very expensive, and
2. interpretation, where raw (prestack) data exist but are not available to interpreters, seismic processing being expensive and performed by other groups.

Let us analyze again a classic summation-technique in PSDM. As already mentioned, the first stage is a back-propagating process in a background velocity field in order to map back the scattered energy at its source, i.e., the scatterer generating it. This because the scatterers are the desired output of earth imaging as explained in the introduction. Let us now think "simulation" of PSDM sections, without referring here to PSDM of synthetic recorded data, which is the classic approach when no real recorded data are available.

Like for the generation of synthetic data, a model of the earth structure is to be assumed. The FT-based approach of GDT shows nicely that, through the use of elastic or electromagnetic waves generated by artificial sources, the recovered value after PSDM is only a filtered-version of the actual structure, the filter being described locally by the available K ([2], [3], [4], [5]). This means that, when the desired input structure is given, there is no need to go through the combined synthetic-data generation/PSDM-process to get the migrated version of that structure! The process is much more straightforward: take a (F)FT of the actual structure, apply a K-filter—defined by the source signature, the survey, the background field and the chosen wave phases—then apply an inverse (F)FT to get the corresponding simulated PSDM section. This is in one sentence the essence of the present patent application, i.e., the simulated local prestack imaging invention.

An object of the new method, recurred in the following as "SimPLI" for Simulated Prestack Local Imaging, is to simulate PSDM sections without needing receiver data, either recorded or synthetic, while overcoming the strong limits of the classic ID convolution method. This will result in a very efficient and cheap process where no receiver data are acquired or calculated, and processed.

Figure 8:
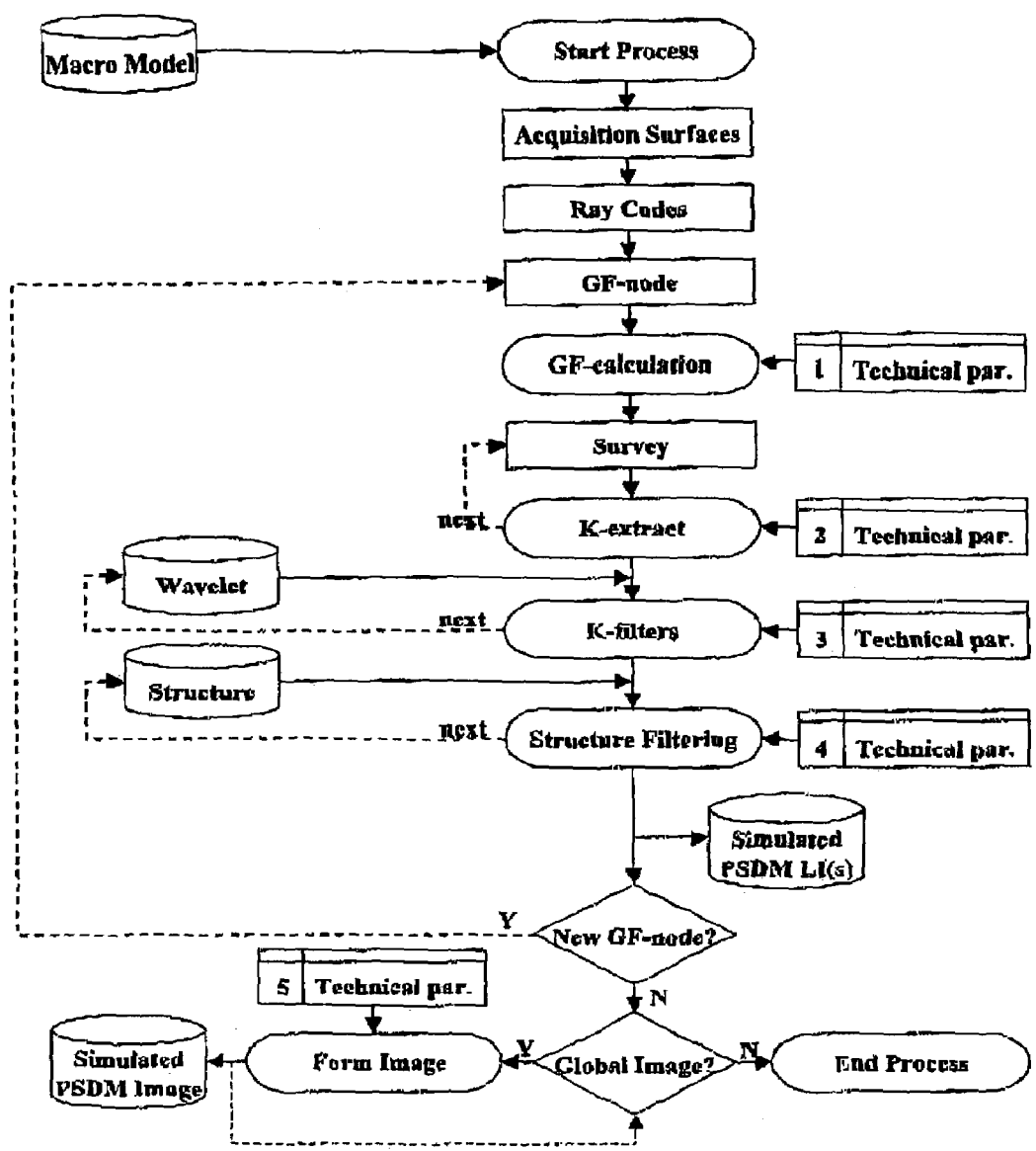
FIG. 8 is a flowchart over a possible code using the present invention to generate simulated prestack depth migrated images.

A flowchart over a preferred embodiment of the present invention using the SimPLI at its inner core is given in FIG. 8. This flowchart can be compared with the one given previously for a possible process using the Local Imaging concept in a GF-node centered approach (FIG. 7). Let us comment the new flowchart with emphasizing the analogies and differences between the two processes:

1. As for the LI process, a background model is necessary for the calculation of the GF and the same model can be used for both processes. As for PSDM, the background model should be smooth in the target area.

2. In order to allow as much flexibility as possible in a simulation process, the survey is not defined explicitly at the start. Instead, acquisition surfaces (lines in 2D) are defined for both sources and receivers. They could be the sea surface, the seafloor, the ground floor in land acquisition, a well, and so on. An arbitrarily regular/irregular sampling of these surfaces is chosen, dense enough for sufficiently accurate interpolation of GF afterwards. The samples are called station points for the GF calculation.

3. As for the PSDM process, wave-phases are to be chosen.

4. For one GF-node: as for the PSDM process, the simulated approach is GF-node centered, i.e., GF are calculated at one GF-node at a time by using a fictitious source at its location. The GF are calculated at each defined location along the acquisition surfaces. In contrary to the PSDM process, where traveltimes are absolutely necessary to perform the back-propagation process prior to imaging, traveltimes are not necessary in the simulated PSDM process, where only K is mandatory. This is a major difference. Traveltimes are necessary in PSDM because the structural information is contained in the input receiver data and must be retrieved from them. In the simulated process, the target structure is a direct and known input, and can come later in the flowchart.

5. For one GF-node: Once the GF are calculated (stored in memory or disk), simple interpolation is applied to get the GF for any survey geometry along the acquisition surfaces, i.e., with varying locations, ranges and sampling. The user is not bounded by the survey, as it would be in a PSDM process because using recorded or synthetic data. So the choice of the survey is a new type of input parameter when compared to the PSDM process.

6. For one GF-node: as for PSDM, the K/ω are extracted wit the same re-ordering, selection and re-sampling possibilities mentioned for the PSDM flowchart given in FIG. 7. This allows testing with the simulation the impact of the K distribution, and to easily define/test possible correction processes. Note that with the survey as a varying parameter, the extraction process can be repeated according to a family of surveys. If angle-dependent reflectivity sums have to be studied in the following, it would be more correct to extract in addition the K/ω as constant reflection-angle set (or a range of angles) in order to apply them separately to the corresponding target structures. This is important for AVO-AVA analyses.

7. For one GF-node: instead of mapping recorded/synthetic energy in the K domain, as done in PSDM, K-filters are built in the SimPLI process and various GF information can be taken into account. Amplitudes (geometrical spreading, transmission loss, and so on) could be accounted for in order to simulate a PSDM process where data would not have been amplitude-corrected. Even traveltimes, if calculated (remember that they are not mandatory in the simulation process), can be used for sort-of amplitude corrections, which are very often applied in industrial PSDM. Fresnel-zone effects in PSDM, due to summation of band-limited signals, should also be considered ([27]) This means in practice that the RF should more characterize reflectors (RSF) than diffractors (PSF). In addition, a wavelet can be integrated in the filter and could correspond to the source signature or the deconvolved-pulse. As for the survey, the wavelet input is a varying parameter and a family of filters can be built, for example to see the evolution of PSDM images according to different frequency contents and distribution.

8. For one GF-node: the target information is entering at that level in the simulated process and can be defined from various types of input. It could be parameter grids, interpreted horizons (after depth conversion if time-horizons) with attributes (reflectivity, for example as defined for AVO-AVA analyses with angle-dependency), and others. From such input, a regular grid is created with the output value to simulate, i.e., reflectivity, object function (Born) and so on (γ(r) in Eq. 2). The preparation of the target models in such grid-form is done prior to the simulation process. Each target model is (F)FT-transformed and kept in memory. For each of them, all available K-filters are applied and inverse-(F)FT give the final output. i.e., the local simulated images. The simulated local images will not show the same distortion effects affecting the "true PSDM" local images because traveltime does not matter here. The structure is known from the start, without distortions, and does not need to be retrieved from receiver data. However, the simulated local imaging is using only the K information at the considered GF-node. But K distributions are spatial-variant ([2], [9]) so an approximation is made when using the same K-filter for the whole simulated local image. This approximation can be compensated for by forming global images from a family of simulated local images like in the PSDM flowchart (FIG. 7).

9. Store the local image is wished.

10. Next GF-node if some.

11. To get a larger simulated PSDM section, taking better into account the fact that K distribution are space-variant, merge the simulated local images, using interpolation between neighboring images. The most exact result is obtained by just considering the reference point of the local images, i.e., keeping the simulated migrated value at the GF-node.

There are many similarities between the usual data based PSDM process and the simulated one, which make easier parallel computer-code programming for both processes. There are however major differences in the input requirements and the level of flexibility with respect to repeated processes. A SimPLI user would be able to study many target models, surveys, and wavelets, compared to a classic PSDM user, who would have to generate synthetic data in each case before studying the PSDM sections. The SimPLI user does not therefore need to know anything about modeling, which only appears for her/him at the GF-calculation. In addition, a ray tracing based GF-calculation is much more robust than a ray tracing based reflection modeling, and can easily be programed as a black-box with no need for the user to interfere.

Figure 9:
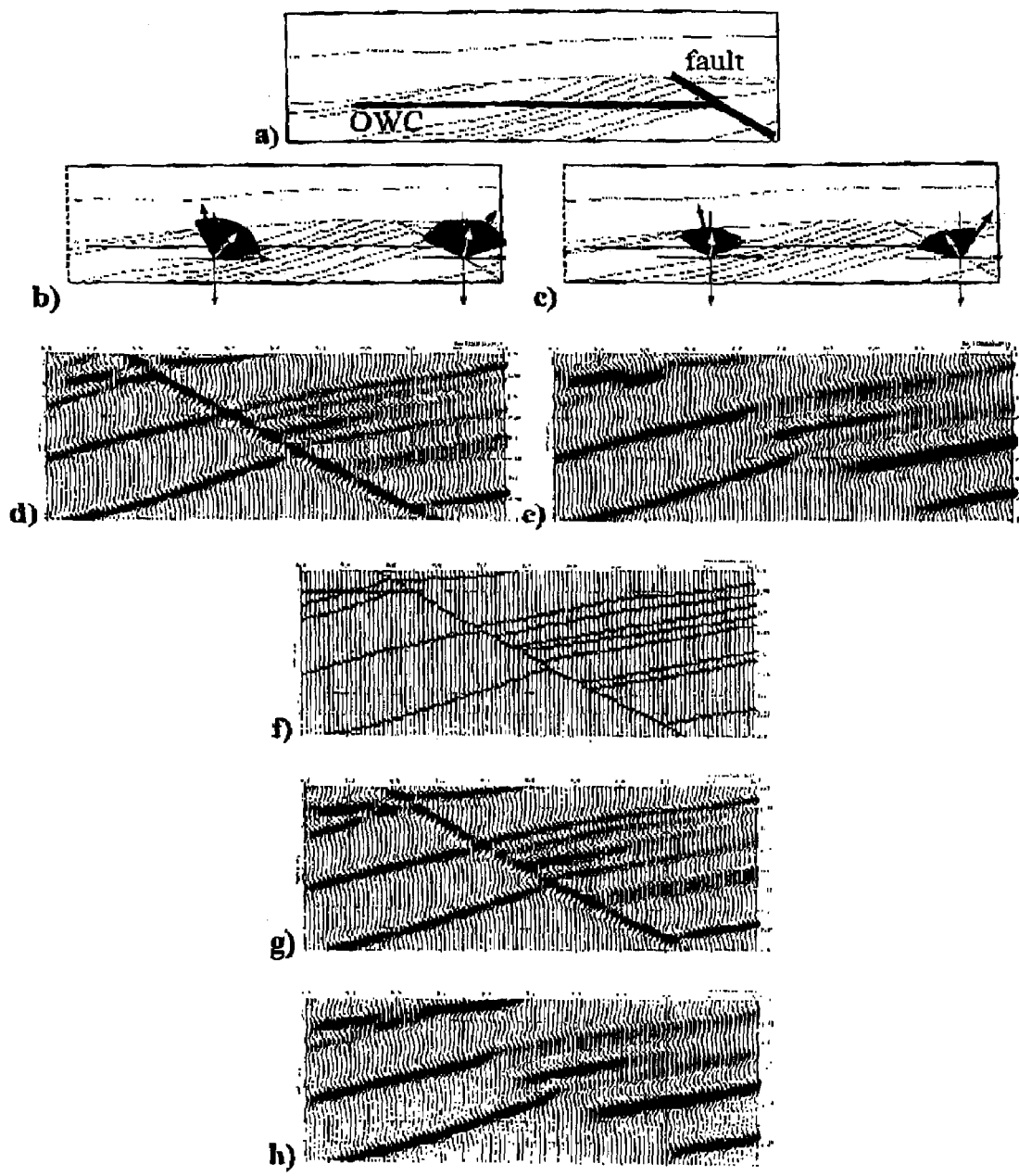
FIG. 9 is an illustration of the results of the present invention.

FIG. 9 illustrates an example of simulated results, with comparison to classic PSDM, in the same model than the one used to illustrate the GDT-PSDM results (FIG. 5). i.e., the Gullfaks oil field in the Norwegian Continental Shelf. Depth horizons in the target area, the OWC, and a fault are indicated as potential objects to analyze with SimPLI (FIG. 9a). The K distributions at two GF-nodes for both near-offset (FIG. 9b), and far-offset sub-selection (FIG. 9c) can be analyzed. At the fault location, there is clearly a good illumination with near-offset (K covers the normal to the fault) and poor illumination at far-offset (poor K coverage around the fault normal). A near- and a far-offset classic PSDM sections are obtained with Diffraction Stack from synthetic data (Kirchhoff modeling). Note that the fault is strongly illuminated on the near-offset section (FIG. 9d) while nearly absent of the far-offset section (FIG. 9e). For the reflectivity grid in FIG. 9f, around the fault, simulated local images obtained for the GF-node at the fault are plotted for both near-offset (FIG. 9g) and far-offset (FIG. 9h). As observed on the corresponding PSDM sections, these two simulated local images show very good illumination of the fault at near-offset and very poor at far-offset. Note also the decrease in resolution across the reflectors—more blurred reflector responses—due to shorter K in the far-offset case (see FIGS. 9b and 9c). Comparisons for both the near-offset case, with FIG. 9d (migrated image) and FIG. 9g (simulated image), and the far-offset case, with FIG. 9c (migrated image) and FIG. 9h (simulated image), show that the simulation process of the present invention gives correct results, i.e., accurate simulated prestack depth migrated images. In addition, the cost of the simulation is much less than the cost of the classic synthetic-data-and-migration approach. A new simulated section is obtained every 20 s in the previous example after selecting another survey, and/or another wavelet, and/or another local structure.

The background model is common to both data based PSDM and the simulated one, hence common GFs. So the simulated local PSDM could also be used, even after data acquisition, either prior to processing (possibly in parallel to the local imaging) to better constrain technical PSDM parameters for improved resolution or check spurious effects due to irregular K distributions, and after processing to help understanding the PSDM sections. Even at the interpretation level, for which re-processing is too complicated and expensive, and the GF used for PSDM are not available, the macro-model could be inherited from processing or a coarser version could be made. This model does not need indeed to be very accurate because traveltimes are not necessary in the simulated process, just the K distributions, whose accuracy is less crucial for the simulated process than the accuracy of traveltimes is for PSDM.

Figure 10:
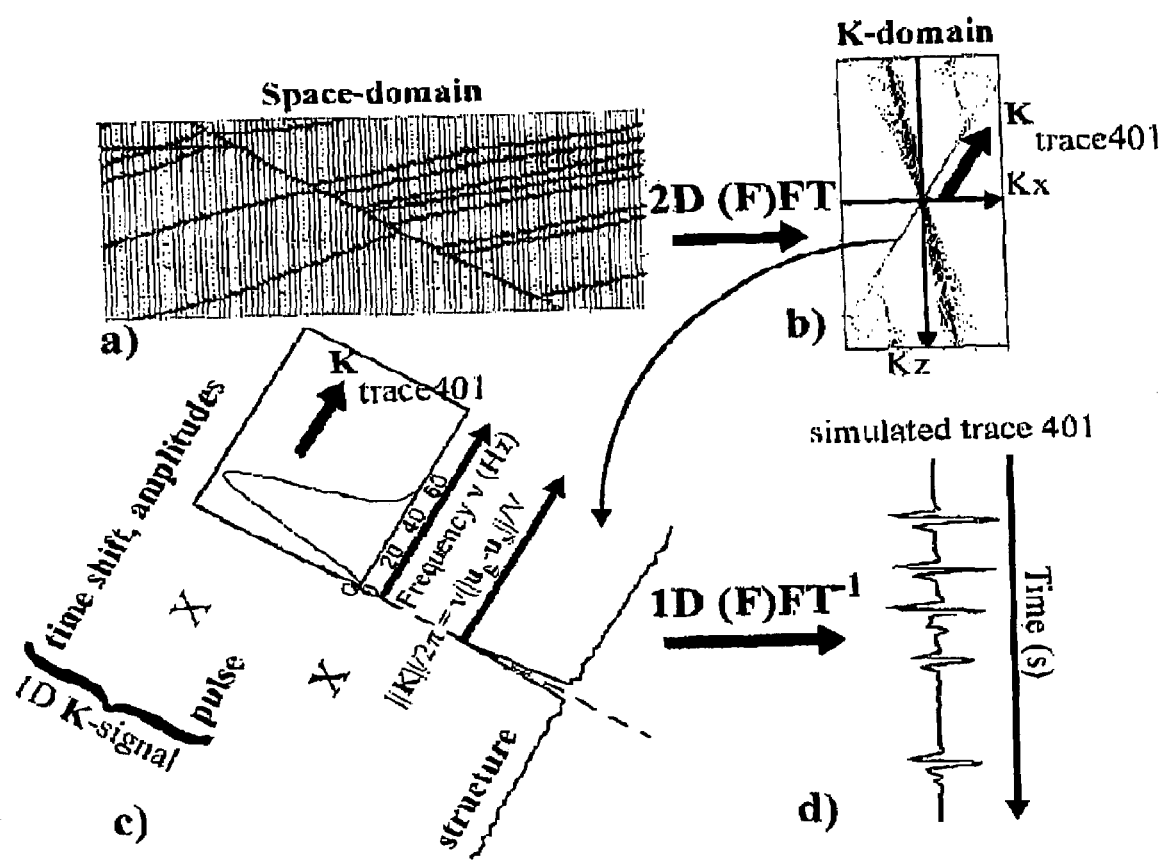
FIG. 10 is a schematic representation of an embodiment of the present invention to generate simulated seismic data in the time-domain.

An embodiment of the present invention is to extract, from the structures after transformation in the K-domain, 1D K-signals for which a wavelet can also be added. If traveltime information is contained in the GFs, it is straightforward to create simulated seismic data by taking an inverse 1D-(F)FT of these 1D K-signals to get a time recording attached to each source-receiver pair of the selected survey (FIG. 10). Such simulated seismic data could be obtained in parallel to the simulated prestack local imaging, in contrary to the classic approach where synthetic data must be first generated before performing a migration. However, the traveltime information is required, in addition to the K, the latter being the only mandatory information for the simulated prestack local imaging.

Objects and features of the present invention are provided by a method simulating local prestack depth migrated images on basis of a selected GF-node characterized in extracting at the GF-node scattering wavenumbers K;
creating at the GF-node K-filters in a scattering wavenumber domain;
applying the K-filters to a target model in the scattering wavenumber domain; and
obtaining a simulated local image by transformation from the K-domain to a space domain.

A preferred embodiment of the present invention is illustrated in the flowchart in FIG. 8, with the 4 fundamental interacting elements of the SimPLI process, i.e.:

1. Scattering wavenumber: the scattering wavenumber K (or K/$\omega$) is the mandatory information for the simulated PSDM process. The definition of K is not relevant, the opposite vector—as often encountered in the classic integral based PSDM literature—being as valid as the one used here (Eq. 1, FIG. 3). K can be calculated by classic ray tracing, or more advanced techniques like Wavefront Construction, or by ray-equivalent methods such as Eikonal solvers.

2. K-extraction: the scattering wavenumbers K (or K/$\omega$) are extracted according to the survey selection (source/receiver) and local parameters such as dip/azimuth/reflection angle. The K can be re-ordered and/or re-sampled by some interpolation process. The natural coordinate system for K is polar in 2D and spherical in 3D, but other systems might be considered.

3. K-filters: K are used to define filters in the K-domain, which will be applied to the considered target structures. Using polar/spherical-to-rectangular mapping is an example of a process where the intention is to get a simpler coordinate system in which the integration can be efficiently performed by (F)FT, This is a classic approach in SAR processing. But more recent SAR techniques work directly from the natural and local coordinate system for K. Note that in SAR, K distributions are regular due to propagation in a homogeneous background (atmosphere) and efficient polar/spherical-to-rectangular mapping requires such regularity in the initial coordinate system. The challenge in other domains, like seismics or GPR due to heterogeneous backgrounds (earth), is to pre-process the K set in order to get a regular sampling in the previous step (K-extract). This would both improve the quality of the images and the efficiency of the mapping process. At that stage, various factors can be introduced such as, for instance, amplitudes to simulate non-preserving amplitude PSDM, and Fresnel zone effects characterizing the lack of lateral resolution in a PSDM process due to summation of band-limited signals ([27]). A wavelet can also be integrated in order to study the effects of band-limited signals and various energy distributions in the frequency domain. The wavelet has major significance for studying resolution across the reflectors and especially for tuning-effects.

4. Structure filtering: in this last step of the SimPLI process, a grid (cube in 3D) with the structure properties to image (reflectivity, object function, etc) is first (F)F-T-transformed into the K-domain, then each pre-calculated filter is applied and an inverse (P)FT gives the corresponding simulated local image in tho space domain. Note that the filters could be applied directly in the space domain by convolving the structure with the RF, i.e., the Fourier Transform of the K-filter.

To generate simulated seismic data, traveltime information is required. Step 3 is then the generation of 1D K-signals in the K-domain, with time shifting according to the traveltime information, and with the possibility of adding a pulse and amplitudes if available (FIGS. 10a, 10b and 10c), note that only the spectrum of the complex signals is plotted). In the equivalent step 4, for each considered local structure, each 1D K-signal is multiplied with the corresponding complex signal of the structure in the K-domain. At last, an inverse 1D (F)FT will give the simulated time recording (seismic data, FIG. 10d). A possible code for the simulation of time recordings is very similar to the one for the simulated prestack local imaging in FIG. 8, as given in FIG. 11, and the two variants can run in parallel to complete each other. The same GFs are used and the user would just have to choose whether he wants both results, or only one at a time, i.e., using the code either in a simulated modeling mode or in a simulated migration mode.

To summarize, SimPLI uses scattering wavenumbers (mandatory) to make filters taking into account many parameters (survey, wave-phases, reflection-angle, wavelet, etc) and later applied to various target models to get simulated local images. SimPLI does not need any input receiver data (neither real nor synthetic) and traveltimes are not necessary. The simulated local images being strictly valid only at their reference point (GF-node), simulated global images can be obtained by merging simulated local images obtained at neighboring GF-nodes. There is also the possibility of simulating seismic data (time recordings) if traveltime information is available.

Figure 11:
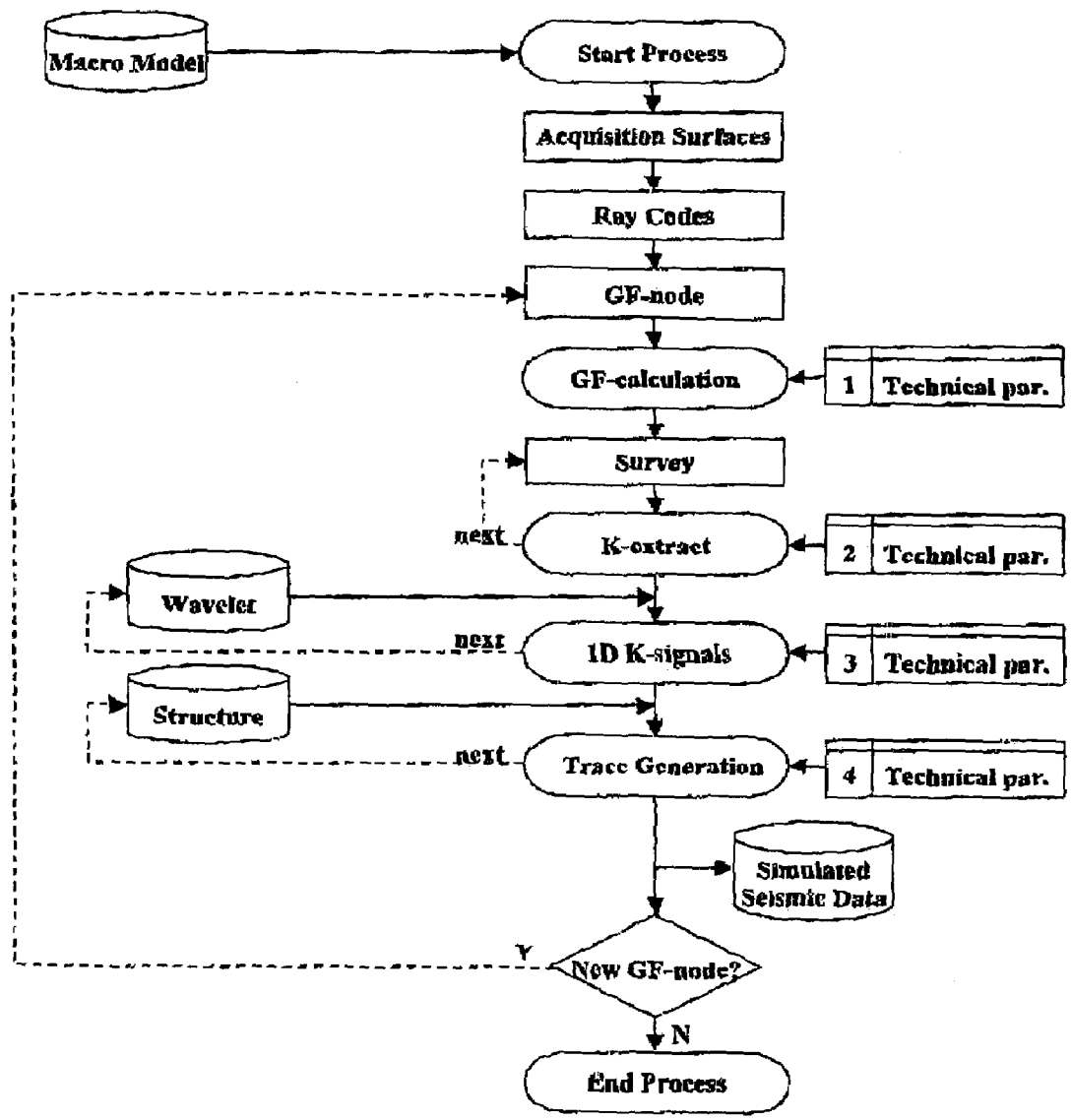
FIG. 11 is a flowchart over a possible code using an embodiment of the present invention to generate simulated seismic data in the time-domain.

The present invention is not restricted to that described above and shown in the drawings, but can also be modified and changed in a number of ways within the scope of the concept of the invention, as stated in the following claims. For example, one can use other modeling methods than ray tracing for computing the Green's functions, like the Eikonal solvers or Gaussian-beams. Re-sampling of the scattering wavenumber set could be easily and with great benefit performed in the polar/spherical system, prior to the rectangular mapping. Many methods for mapping in the scattering wavenumber domain can also be considered, the literature about SAR processing being extensive about this topic ([26]). The simulated local prestack imaging provides depth sections, which can be time-converted by simple vertical stretching or by using more advanced ray-mapping techniques. The flowcharts in FIG. 8 and FIG. 11 are especially designed for survey-planning type of studies but, by re-organizing the elements and still keeping the K-extraction. K-filters/1D K-signals and structure filtering/trace generation, other flowcharts may be designed to better fit for other specific applications like in interpretation, AVO/AVA studies, and PSDM pre-/post-analyses. Applications in other domains than seismics and GPR are also possible, especially in acoustical, and medical imaging, for which similar wave-propagation is encountered.

REFERENCES CITED

[1] Yilmaz, Ö., 2001. Seismic Data Analysis; Processing, Inversion, and Interpretation of Seismic Data, Vol I and II. Society of Exploration Geophysicists, ISBN 1-56080-098-4 (Volume I) and ISBN 1-56080-099-2 (Volume II).

[2] Lecomte, I., and Gelius, L. -J., 1998. Have a look at the resolution of prestack migration for any model, survey and wavefields, Expanded Abstracts, 68$^{th}$ SEG Annual Meeting, New-Orleans, SP2.3.

[3] Gelius, L. -J., and Lecomte, I., 1999. The resolution function in prestack depth migration. Extended Abstracts, EAGE 61st Annual Meeting, Helsinki, P134.

[4] Gelius, L. -J., and Lecomte, I., 2000. The resolution function in linearized Born and Kirchhoff inversion, In: Lecture Notes in Earth Sciences; Methods and Applications of Inversion (P. C. Hanse, B. H. Jacobsen and K. Mosegaard, eds). Springer Verlag.

[5] Gelius, L. -J., Lecomte, I., and Tabti, H., 2002. Analysis of the resolution function in seismic prestack depth imaging, Geophysical Prospecting, 50, 505-515.

[6] Hamran, S. -E., and Lecomte, I., 1993. Local plane wavenumber diffraction tomography in heterogeneous background. Part I: Theory, Jrnl. Seismic Explor., 2, 133-146.

[7] Lecomte, I., and Hamran, S. -E., 1993. Local plane wavenumber diffraction tomography in heterogeneous background. Part II; Green's functions and finite-difference traveltimes, Jrnl. Seismic Explor., 2, 287-299.

[8] Lecomte, I., 1999. Local and controlled prestack depth migration in complex areas, Geophysical Prospecting, 47, 799-818.

[9] Lecomte, I., Hamran, S. -E., Tabti, H., and Gelius, L. -J., 2001. New insights in migration through analogies between Generalized Diffraction Tomography and Synthetic Aperture Radar, Expanded Abstracts, 71$^{st}$ SEG Annual Meeting, San Antonio, MIG P1.4.

[10] Lecomte, I., Hamran, S. -E., and Gelius, L. -J., 2001. Improving Kirchhoff migration with repeated Local Plane-Wave Imaging; a SAR-inspired signal-processing approach, submitted to Geophysics, December 2001.

[11] Hamran, S. -E., Lecomte, I., and Gelius, L. -J., 2002. GPR Processing using Local Plane-Wave Imaging, Proceedings, GPR 2002 Conference, Santa-Barbara.

[12] Lecomte, I., Hamran, S. -E., and Gelius, L. -J., 2002. Local Imaging approach and applications, Extended Abstracts, 64$^{th}$ EAGE Annual Meeting, Florence, 017.

[13] Hamran, S. -E., Lecomte, I., and Gelius, L. -J., 2003. Local Plane-Wave Imaging of GPR Data, Jrnl. Environmental and Engineering Geophysics, in press.

[14] Aki, K., and Richards, P. G., 1980. Quantitative Seismology, Theory and Methods: Volume I, Editor: Allan Cox, W. H. Freeman and Company, New York.

[15] Bleistein, N., 1987. On the imaging of reflectors in the earth, Geophysics, 52, 931-942.

[16] Miller, D. Onistaglio, M., and Beylkin, G., 1987. A new slant on seismic imaging: migration and integral geometry, Geophysics, 52, 943-964.

[17] Schneider, W. A., 1978. Integral formulation for migration in two and three dimensions, Geophysics, 43, 49-76.

[18] Hubral, P., Tygel, M., and Zien, H., 1991. Three-dimensional true-amplitude zero-offset migration, Geophysics, 56, 18-26.

[19] Schleicher, J., Tygel, M., and Hubral, P., 1993. 3D true-amplitude finite-offset migration, Geophysics, 58, 1112-1126.

[20] Vinje, V., Iversen, E., Åstebøl, K., and Gjøystdal, H., 1996, Estimation of multivalued arrivals using wavefront construction—Part I: Geophysical Prospecting, 44. 819-842.

[21] Vinje, V., Iversen, E., Åstebøl, K., and Gjøystdal, H., 1996, Estimation of multivalued arrivals using wavefront construction—Part II: Tracing and interpolation: Geophysical Prospecting, 44, 843-858.

[22] Vinje, V., Iversen, E., and Gjøystdal, H., 1993, Traveltime and amplitude estimation using wavefront construction, Geophysics, 58, 1157-1166.

[23] Vidale, J. 1988. Finite-difference calculation of trail times. Bulletin of the Seismological Society of America, 78, 2062-2076.

[24] Podvin, P., and Lecomte, I., 1991. Finite difference computation of traveltimes in very contrasted velocity models: a massively parallel approach and its associated tools, Geophys. J. Int., 105, 271-284.

[25] Gelius, L. -J., Johansen, I., Sponheim, N., and Stamnos, J. J., 1991. A generalized diffraction tomography algorithm, J. Acoust. Soc. Am., 89, 523-528.

[26] Jakowatz, C. V. Jr., Wahl, D. E., Eichel, P. H., Ghiglia, D. C., and Thompson, P. A., 1996. Spotlight-mode Synthetic Aperture Radar: a signal processing approach. Kluwer Academic Publishers.

[27] Laurain, R., Vinje, V., and Mispel, J., 2002. Simulated Migration Amplitudes, Expanded Abstracts, 71$^{st}$ SEG Annual Meeting, Salt Lake City.

The invention claimed is:

1. Method simulating local prestack depth migrated images on basis of a model of a selected GF-node, comprising:
    defining station points from acquisition surfaces;
    calcaulating the GF;
    extracting at the GF-node scattering wavenumbers K;
    creating at the GF-node K-filters in a scattering wavenumber domain;
    applying the K-filters to a target model in the scattering wavenumber domain; and obtaining a simulated local image by transformation from the K-domain to a space domain, wherein said method is conducted without the use of real or synthetic recorded data.

2. Method according to claim 1, wherein the extraction of the K is done with different sub-selections in source/receiver locations, and/or locally in the dip/azimuth/reflection angle domain at the GF-node.

3. Method according to claim 2, wherein re-sampling of the K distribution is done with interpolation to get regular distribution, in order to improve the quality of the simulated local image and speed-up the following mapping process in the K-domain.

4. Method according to claim 2, wherein other GF parameters are extracted in parallel to the K.

5. Method according to claim 4, wherein amplitudes are extracted.

6. Method according to claim 4, wherein traveltimes are extracted.

7. Method according to claim 4, further comprising using amplitudes for creating the K-filters.

8. Method according to claim 1, wherein the K-filters are created by mapping the K on a grid suited for a summation process in terms of efficiency and quality, mapping techniques for which many public and registered techniques existing in the Synthetic Aperture Radar domain, can be used.

9. Method according to claim 8, wherein the mapping of the K on a regular grid is done by the nearest-point mapping.

10. Method according to claim 9, wherein the mapping includes taking care of the Jacobian of the transformation between the original K coordinate system, polar in 2D and spherical in 3D, and the one used for the integration, the simplest being counting the number of K assigned to a sample and dividing the total result by this number.

11. Method according to claim 8, wherein the values assigned to each K sample is a function of factors, selected from the group consisting of propagation amplitudes to simulate non-preserving amplitude PSDM, angle-dependent reflectivity, Fresnel-zone factor to obtain the frequency-dependent "lateral" smoothing effect done by PSDM when working with band-limited signals, and scattering-pattern factors.

12. Method according to claim 8, wherein the values assigned to each K sample is multiplied by a pulse to get the band-limited signal effect on the resolution across the reflectors, this pulse being the source-signature if no source correction is to be considered, or the deconvolved pulse if deconvolution is supposed to be done prior to the imaging, or a pulse used to test resolution improvements with the simulated process.

13. Method according to claim 1, wherein target models to study are defined from various types of input selected from the group consisting of parameter grids, interpreted horizons—either in time and depth—with attributes, ray-tracing models, finite-differences models, reservoir models, and are created in the same coordinate system than the one used for the K-filters, the target model parameter to map depending on the type of PSDM to simulate.

14. Method according to claim 1, wherein the final transformation from the K-domain to the space-domain is done by a numerical summation method.

15. Method according to claim 1, wherein the numerical summation method is a FFT summation method.

16. A method of producing a data set representing the simulated prestack local images comprising:

(a) extracting at the GF-node scattering wavenumbers K;
(b) creating at the GF-node K-filters in a scattering wavenumber domain;
(c) applying the K-filters to a target model in the scattering wavenumber domain; and
(d) obtaining a simulated local image by transformation from the K-domain to a space domain; wherein the method is conducted without the use of real or synthetic recorded data.

17. Method simulating seismic traces on basis of a model of a selected Gf-node, comprising
   extracting at the GF-node scattering wavenumbers K and traveltime;
   creating at the GF-node and along a given K, 1D K-filters, also called 1D K-signals, in a frequency domain;
   applying the 1D K-signals to a target model along a given K and in the frequency domain; and obtaining a simulated seismic trace by transformation from the frequency domain to a time domain, wherein the method is conducted without the use of real or synthetic recorded data.

18. Method according to claim 17, further comprising using amplitudes for creating the 1D K-signals.

19. Method according to claim 17, wherein the K-signals are created by mapping the K along a frequency line suited for a summation process in terms of efficiency and quality.

20. Method according to claim 19, wherein the mapping of the K along a frequency line is done by the nearest-point mapping.

21. Method according to claim 19, wherein the values assigned to each frequency sample of a 1D K-signal is a function of factors selected from the group consisting of propagation amplitudes to simulate non-preserving amplitude PSDM, angle-dependent reflectivity, and other scattering-pattern factors.

22. Method according to claim 19, wherein the values assigned to each frequency sample is multiplied by a pulse to get the band-limited signal effect, this pulse being the source-signature if no source correction is to be considered, or the deconvolved pulse if deconvolution is supposed to be done prior to the imaging, or a pulse used to test resolution improvements with the simulated process.

23. Method according to claim 17, wherein the final transformation from the frequency domain to the time domain is done by a numerical summation method.

24. Method according to claim 23, wherein the numerical summation method is a FFT summation method.

25. A method of producing a data set representing simulated seismic traces, comprising:

(a) extracting at the GF-node scattering wavenumbers K and traveltime;
(b) creating at the GF-node and along a given K, 1D K-filters, also called 1D K-signals, in a frequency domain;
(c) applying the 1D K-signals to a target model along a given K in the frequency domain; and
(d) obtaining a simulated seismic trace by transformation from the frequency domain to a time domain, wherein the method is conducted without the use of real or synthetic recorded data.

* * * * *